United States Patent
Woody et al.

(10) Patent No.: US 7,723,874 B2
(45) Date of Patent: May 25, 2010

(54) COOLING SYSTEMS AND METHODS FOR INTEGRATION ELECTRIC MOTOR-INVERTERS

(75) Inventors: George R. Woody, Redondo Beach, CA (US); Karl D. Conroy, Huntington Beach, CA (US); James M. Nagashima, Cerritos, CA (US); David F. Nelson, Redondo Beach, CA (US); Eric R. Ostrom, Bellflower, CA (US); Gregory S. Smith, Woodland Hills, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 299 days.

(21) Appl. No.: 12/032,359

(22) Filed: Feb. 15, 2008

(65) Prior Publication Data

US 2009/0206687 A1 Aug. 20, 2009

(51) Int. Cl.
*H02K 9/00* (2006.01)
(52) U.S. Cl. .......................... 310/52; 310/54
(58) Field of Classification Search ............ 310/52–54, 310/57, 68 D; 62/99, 259.2
See application file for complete search history.

(56) References Cited

U.S. PATENT DOCUMENTS

| | | | | | |
|---|---|---|---|---|---|
| 2,964,659 | A | * | 12/1960 | Steele III et al. | 310/54 |
| 3,009,072 | A | * | 11/1961 | Mossay | 310/57 |
| 6,997,687 | B2 | * | 2/2006 | Iritani | 417/371 |
| 7,030,520 | B2 | * | 4/2006 | Takenaka et al. | 310/64 |
| 2006/0174642 | A1 | * | 8/2006 | Nagashima et al. | 62/259.2 |

* cited by examiner

*Primary Examiner*—Dang D Le
(74) *Attorney, Agent, or Firm*—Ingrassia Fisher & Lorenz, P.C.

(57) ABSTRACT

Cooling systems and methods are provided for an integrated electric motor-inverter, where the integrated electric motor-inverter includes a housing, a motor, and an inverter, the motor and the inverter are disposed within the housing, and the motor includes a stator. The system includes a cooling jacket, a first coolant, a condenser, a spray head, and a second coolant. The cooling jacket is disposed concentric to the stator and includes an inner wall and an outer wall. The inner wall is in direct contact with the stator. The first coolant is disposed between the cooling jacket inner and outer walls. The condenser is disposed concentric to the cooling jacket. The spray head is disposed adjacent the inverter. The second coolant is in flow communication with the spray head.

20 Claims, 4 Drawing Sheets

COOLING SYSTEMS AND METHODS FOR INTEGRATION ELECTRIC MOTOR-INVERTERS

TECHNICAL FIELD

The inventive subject matter generally relates to an integrated electric motor-inverter, and more particularly relates to cooling systems and methods for integrated electric motor-inverters.

BACKGROUND OF THE INVENTIVE SUBJECT MATTER

Vehicles that utilize electric traction motors to drive wheels of a vehicle typically use a three-phase alternating current ("AC") motor coupled with an inverter having circuitry that converts direct current ("DC") from a power source to alternating current. The inverter circuitry generally includes insulated gate bipolar transistors ("IGBTs") and diodes mounted on a direct bonded copper ("DBC") substrate. The DBC has integrated bus bars that operate with a circuit card and signal connector to provide a power electronics package.

During operation, the inverter converts DC current to AC current with an associated efficiency. Some energy produced by the inverter may be removed as heat to ensure that components thereof remain within allowable operating temperature limits. Currently, this is accomplished by circulating fluids through heat sinks associated with the DBC or by flowing air over the power electronics package to absorb and carry away heat. Although these configurations generally operate sufficiently, they may be improved. For example, conventional systems that cool by circulating fluids or flowing air typically operate in conjunction with other separately packaged motor cooling systems. However, as the demand for smaller vehicles has increased, optimization of space utilization has increased as well, and the current packaging of the inverters, motors, and cooling systems may be too large for these smaller vehicles.

Accordingly, it is desirable to have an electric traction motor and inverter package that is smaller than a conventional motor and inverter package. In addition, it is desirable to suitably cool the inverter such that component temperatures may be controlled. Furthermore, other desirable features and characteristics of the inventive subject matter will become apparent from the subsequent detailed description and the appended claims, taken in conjunction with the accompanying drawings and the foregoing technical field and background.

SUMMARY OF THE INVENTIVE SUBJECT MATTER

In accordance with an embodiment, by way of example only, a cooling system is provided for an integrated electric motor-inverter, where the integrated electric motor-inverter includes a housing, a motor, and an inverter, the motor and the inverter are within the housing, and the motor includes a stator. The system includes a cooling jacket, a first coolant, a condenser, a spray head, and a second coolant. The cooling jacket is disposed concentric to the stator and includes an inner wall and an outer wall. The inner wall is in direct contact with the stator. The first coolant is disposed between the cooling jacket inner and outer walls. The condenser is disposed concentric to the cooling jacket. The spray head is disposed adjacent the inverter within the housing. The second coolant is in flow communication with the spray head. During system operation, (i) the second coolant is directed onto the inverter by the spray head, (ii) at least a portion of the second coolant enters the condenser in a gas phase, and (iii) the second coolant contacts the cooling jacket outer wall and heat from the second coolant is transferred through the cooling jacket to the first coolant causing the second coolant to phase change into a liquid.

In another embodiment, by way of example only, a cooling system is provided. The cooling system includes a heat exchanger, a first coolant, an integrated electric motor-inverter, a cooling jacket, a condenser, a spray head, and a second coolant. The first coolant is in fluid communication with the heat exchanger. The integrated electric motor-inverter is in thermal communication with the first coolant and includes a housing, a motor, and an inverter. The motor and the inverter are disposed within the housing, and the motor includes a stator. The cooling jacket is disposed concentric to the stator and includes an inner wall and an outer wall and the first coolant disposed therebetween. The inner wall is in direct contact with the stator. The condenser is disposed concentric to the cooling jacket. The spray head is disposed adjacent the inverter within the housing. The second coolant is in flow communication with the spray head. During system operation, (i) the second coolant is directed onto the inverter by the spray head, (ii) at least a portion of the second coolant enters the condenser in a gas phase, and (iii) the second coolant contacts the cooling jacket outer wall and heat from the second coolant is transferred through the cooling jacket to the first coolant causing the second coolant to phase change into a liquid.

In still another embodiment, by way of example only, a method is provided for cooling an integrated electric motor-inverter, the integrated electric motor-inverter including a housing, a motor, and an inverter, the motor and the inverter disposed within the housing, and the motor including a stator. The method includes the steps of flowing a first coolant through a cooling jacket defined, in part, by an inner wall and an outer wall, the inner and outer walls disposed concentric to the stator, and the inner wall in direct contact with the stator such that heat is absorbed from the stator through the cooling jacket inner wall into the first coolant, and directing a second coolant onto the inverter, wherein the second coolant migrates into a condenser in a gas phase, the condenser disposed concentric to the cooling jacket and defined, in part by an outer surface of the cooling jacket outer wall and the gas phase second coolant contacts the cooling jacket outer wall outer surface to transfer heat from the second coolant to thereto and phase change the gas phase second coolant into a liquid second coolant.

DESCRIPTION OF THE DRAWINGS

The present inventive subject matter will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the inventive subject matter or the application and uses of the inventive subject matter. Furthermore, there is no intention to be bound by any expressed or implied theory presented in the preceding technical field, background, brief summary or the following detailed description.

Figure 1:
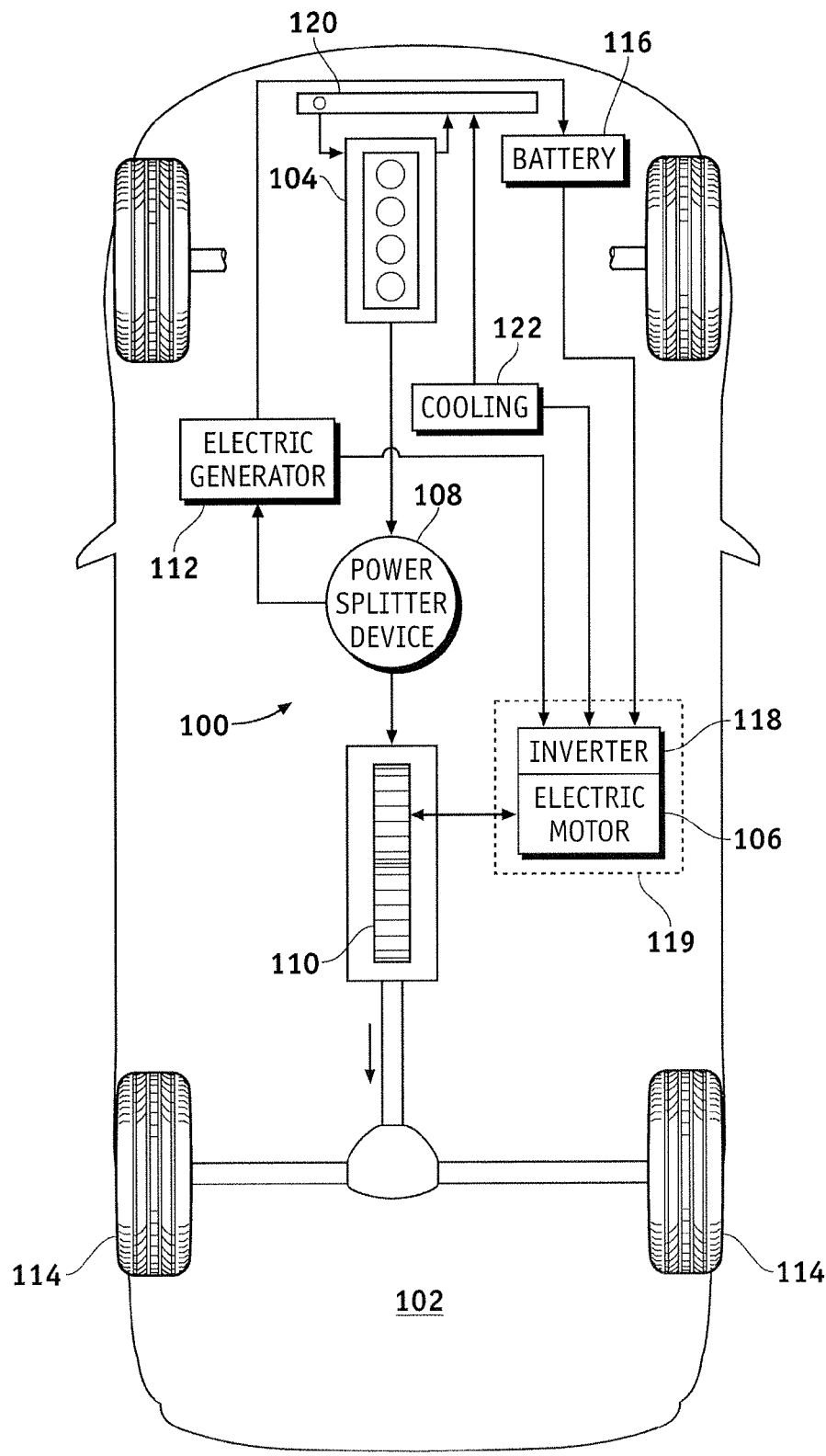
FIG. 1 is a schematic of a gas-electric drive implemented into a vehicle, according to an embodiment.

FIG. 1 is a schematic of a gas-electric drive 100 implemented into a vehicle 102. In an embodiment, the gas-electric drive 100 may include an internal combustion engine 104 and an electric traction motor 106. The internal combustion engine 104 generates power and is in operative communication with a power splitter device 108 that divides the generated power between a transmission 110 and an electric generator 112. As shown in FIG. 1, the transmission 110 may be configured to drive wheels 114 of the vehicle 102. The electric generator 112 generates more power that may be used to charge a battery 116. The battery 116 may supply current to an inverter 118, which in turn, supplies power to the electric traction motor 106. In an embodiment, the inverter 118 and the electric traction motor 106 may be an integral component and thus, may be a single module (e.g., integrated electric motor-inverter 119). Alternatively, the electric traction motor 106 may receive power directly from the electric generator 112.

After a period of operation, the internal combustion engine 104 or the electric traction motor 106 may increase in temperature. To maintain the temperatures within an acceptable range (e.g., ±10 degrees), a heat exchanger 120 and a motor-inverter cooling system 122 may be included. The heat exchanger 120 may be thermally coupled to the motor-inverter cooling system 122.

Figure 2:
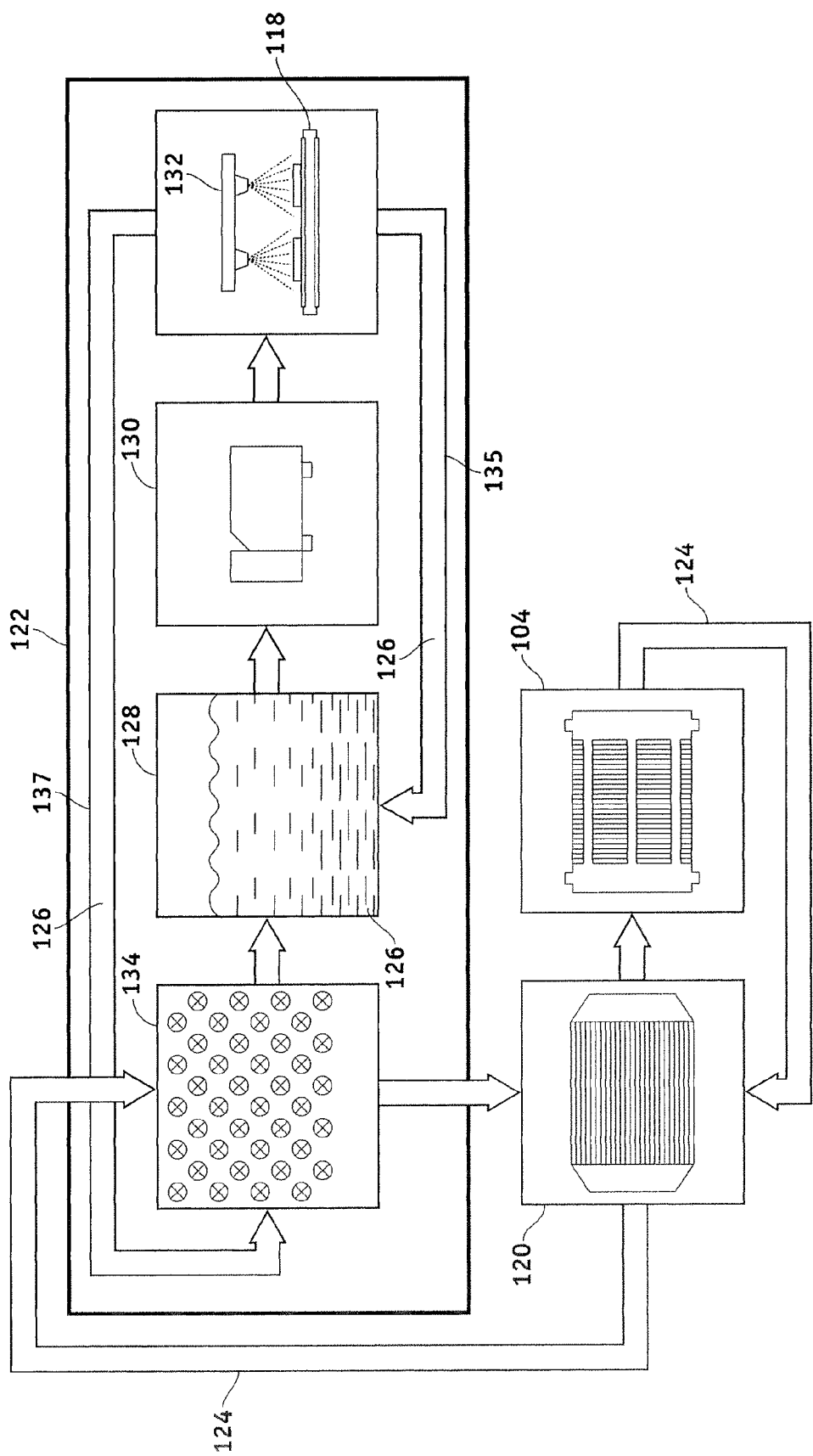
FIG. 2 is a schematic of a heat exchanger and motor-inverter cooling system, according to an embodiment.

With reference to FIG. 2, a schematic of the heat exchanger 120 and motor-inverter cooling system 122 are shown. The heat exchanger 120 may thermally communicate with and cool the internal combustion engine 104 by circulating a first coolant 124 therebetween. In an embodiment, the first coolant 124 may be water ethylene glycol. The motor-inverter cooling system 122 is configured to circulate a second coolant 126 therethrough, which thermally communicates with the first coolant 124 within the condenser-cooling jacket assembly 134. In an embodiment, the second coolant 126 may be a composition that does not electrically interact with or degrade the components of the inverter 118, such as a dielectric liquid coolant. In an embodiment, the dielectric liquid coolant may include mixtures of methylsiloxane and an organic compound such as polypropylene glycol methyl ether. In another embodiment, the dielectric liquid coolant may include mixtures of hexmethyldisiloxane and propylene glycol methyl ether, where the hexmethyidisiloxane has a percentage by weight greater than about 60%, and the propyleneglycol methyl ether has a percentage by weight in a range of about 10% to about 30%. As used herein, the term "about" means within 0.5%. Other compositions, which have minimal instability and reactivity with the electrical components of the inverter 118, may be used as alternatives.

The motor-inverter cooling system 122 may include a reservoir 128 containing a portion of the second coolant 126 that may be pumped by a sump pump assembly 130. The sump pump assembly 130 may be in flow communication with one or more spray heads 132 that may be disposed over a portion of the inverter 118. The spray heads 132 spray the second coolant 126 on and cool the inverter 118. After being sprayed, a portion of the second coolant 126 may be in a gaseous phase and may migrate into a condenser-cooling jacket assembly 134 via a vapor return path 137 while the remainder, being in a liquid state, may migrate to a reservoir 128 via an overspray return path 135. The condenser-cooling jacket assembly 134 is thermally coupled to the first coolant 124 so that when the gas-phase second coolant 126 enters the condenser-cooling jacket assembly 134, heat in the second coolant 126 may be transferred to the first coolant 124 to thereby cause the gas-phase second coolant 126 to phase change back into a liquid. The liquid-phase second coolant 126 may then be recirculated through the motor-inverter cooling system 122 (e.g., into reservoir 128).

Figure 3:
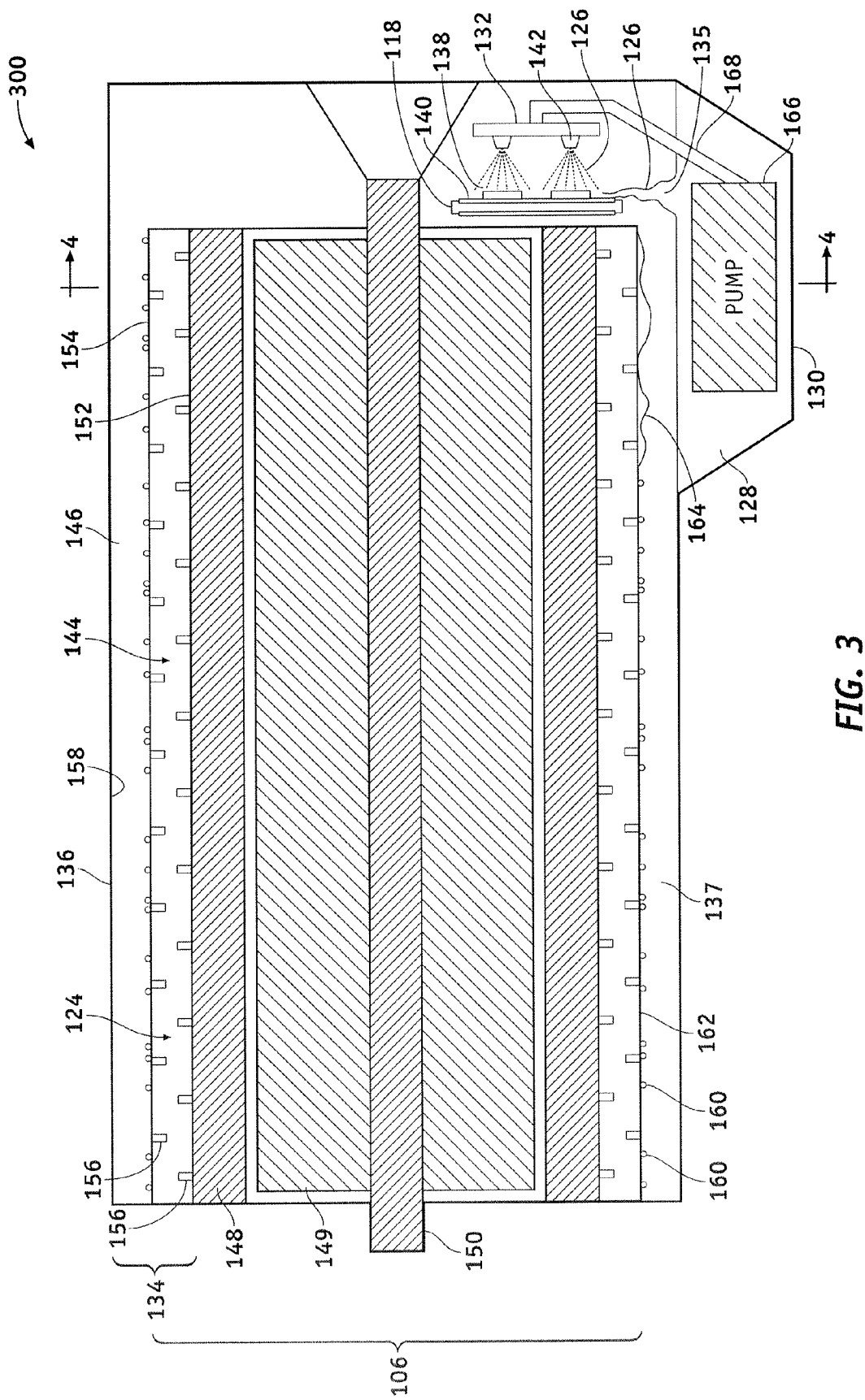
FIG. 3 is a side cross-sectional view of an integrated electric motor-inverter, according to an embodiment.
Figure 4:
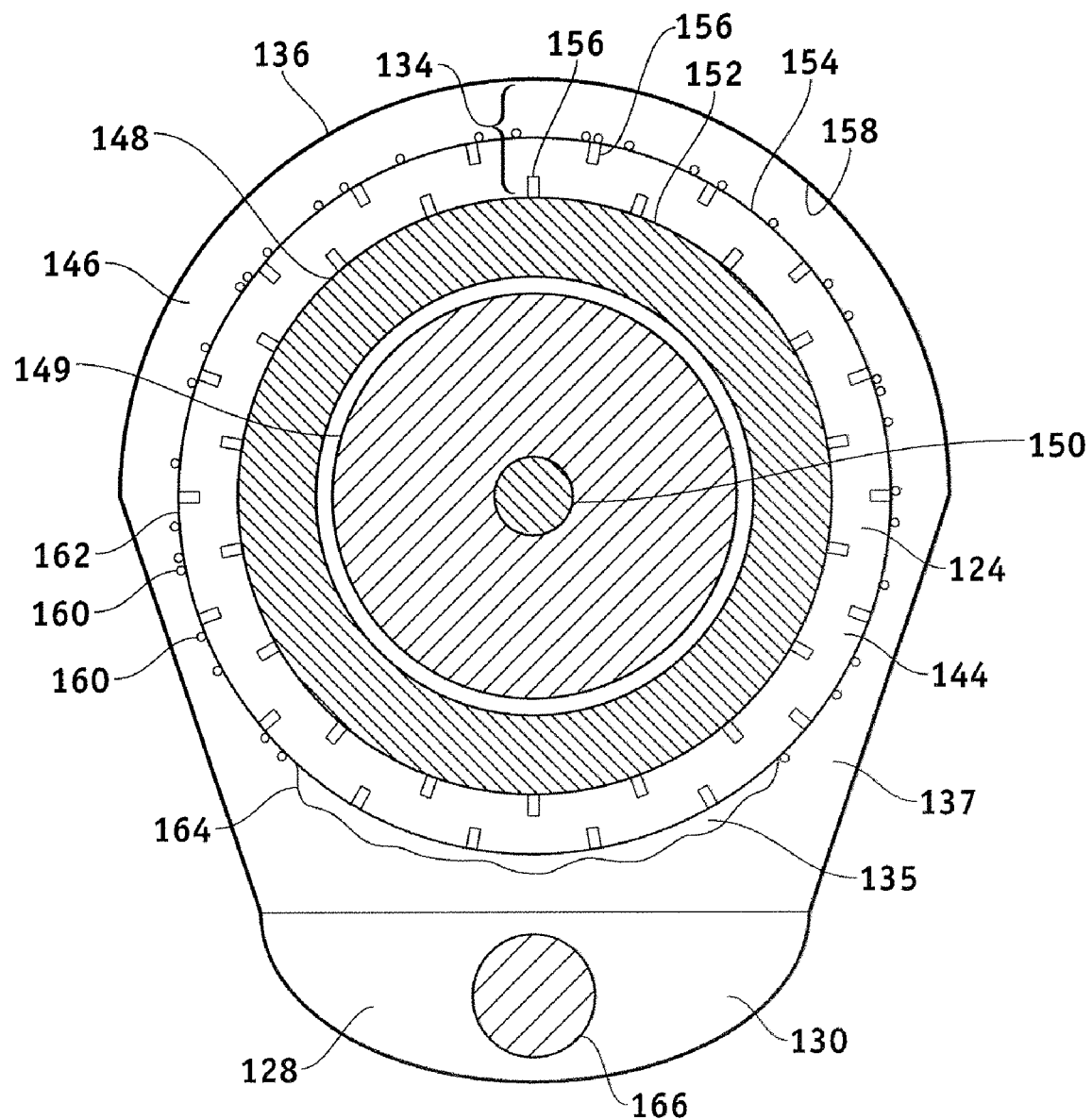
FIG. 4 is a cross-sectional view of the integrated electric motor-inverter shown in FIG. 3 taken along line 4-4, according to an embodiment.

Turning now to FIGS. 3 and 4, the motor-inverter cooling system 122 is shown implemented within an integrated electric motor-inverter 300, according to an embodiment. In particular, FIG. 3 is a side cross-sectional view of the electric motor-inverter 300, and FIG. 4 is a cross-sectional view of the electric motor-inverter 300 shown in FIG. 3 taken along line 4-4. The electric motor-inverter 300 generally includes the inverter 118 and the electric traction motor 106 disposed within a housing 136. The inverter 118 is disposed adjacent to the electric traction motor 106 on one side. In an embodiment, one or more spray heads 132 may be disposed adjacent the inverter 118 on the other side, the condenser-cooling jacket assembly 134 may be disposed concentric to the electric traction motor 106, and the sump pump assembly 130 may be positioned to communicate between the condenser-cooling jacket assembly 134 and the spray heads 132. These components will now be discussed in more detail.

In an embodiment, the inverter 118 includes power electronics that may be made up of one or more insulated gate bipolar transistors (IGBTs) 138 bonded with a direct bonded copper (DBC) substrate 140. The DBC substrate 140 may be integrated with an AC/DC bus (not shown) to form an inverter circuit. The spray heads 132 are disposed such that spray nozzles 142 thereof may be in sufficient proximity to the IGBTs 138 and DBC substrate 140 to dispense second coolant 126 directly thereon.

The second coolant 126 may be dispensed in stream form or flooded over the inverter 118. In another embodiment, the second coolant 126 may be sprayed as a mist or in discrete droplets onto the inverter 118. Liquid from overspray may return to the reservoir 128 via an overspray return path 135.

As mentioned above, when the second coolant 126 is in a gaseous phase, it may migrate to and collect on the condenser-cooling jacket assembly 134. The condenser-cooling jacket assembly 134 includes a cooling jacket 144 and a condenser 146 that are mounted to the electric traction motor 106. The cooling jacket 144 may be disposed concentric to a stator 148, a rotor 149, and a shaft 150 of the electric traction motor 106 and may extend at least partially along the length of the stator 148. In an embodiment, as shown in FIG. 3, the cooling jacket 144 may extend along an entire length of the stator 148.

The cooling jacket 144 is configured to receive the first coolant 124 from the heat exchanger 120 (FIG. 2), and in this regard, includes an inner wall 152 and an outer wall 154 forming a space therebetween through which the first coolant 124 may flow. The inner wall 152 may be in thermal (e.g., direct) contact with the stator 148 so that heat therefrom may transfer to the first coolant 124. In an embodiment, pin fins 156 may extend from the inner wall 152 towards the outer wall 154 or from the outer wall 154 towards the inner wall 152 to enhance heat transfer from the stator 148 to the first coolant 124.

The condenser 146 may be disposed concentric to the cooling jacket 144 and may extend at least partially along the length thereof. In an embodiment, as depicted in FIG. 3, the condenser 146 may extend an entire length of the cooling jacket 144. The condenser 146 may be defined, in part by the cooling jacket outer wall 154 and an inner surface 158 of the electric motor-inverter housing 136. Thus, when the gaseous-phase second coolant 126 contacts an outer surface 162 of the cooling jacket outer wall 154, it may condense and form condensed droplets 160. Specifically, heat from the gaseous-phase second coolant 126 may be transferred through the cooling jacket outer wall 154 to the first coolant 124 causing the second coolant 126 to phase change into a liquid 164. The droplets 160 and liquid 164 may return to the reservoir 128 via the vapor return path 137.

As alluded to briefly above, the liquid second coolant 126 may collect in the reservoir 128. In an embodiment, the reservoir 128 may be in flow communication the sump pump assembly 130, which may be used to return the second coolant 126 to the spray heads 132. The sump pump assembly 130 may include a pump 166 that pumps the second coolant 126 back to the spray heads 132 via a return line 168. The second coolant 126 may then be directed onto the inverter 118 by spraying the second coolant 126 through the spray nozzles 142 to once again cool the inverter 118.

An integrated electric motor-inverter has now been described that may have a smaller package than conventional inverters and motors. In addition, the integrated electric motor-inverter may be cooled such that temperature fluctuations are controlled and component expansions and contractions may be maintained within an acceptable range.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing the exemplary embodiment or exemplary embodiments. It should be understood that various changes can be made in the function and arrangement of elements without departing from the scope of the inventive subject matter as set forth in the appended claims and the legal equivalents thereof.

What is claimed is:

1. A cooling system for an integrated electric motor-inverter, the integrated electric motor-inverter including a housing, a motor, and an inverter, the motor and the inverter disposed within the housing, and the motor including a stator, the system comprising:
    a cooling jacket disposed concentric to the stator and including an inner wall and an outer wall, the inner wall in direct contact with the stator;
    a first coolant disposed between the cooling jacket inner and outer walls;
    a condenser disposed concentric to the cooling jacket;
    a spray head disposed adjacent the inverter within the housing; and
    a second coolant in flow communication with the spray head,
    wherein during system operation, (i) the second coolant is directed onto the inverter by the spray head, (ii) at least a portion of the second coolant enters the condenser in a gas phase, and (iii) the second coolant contacts the cooling jacket outer wall and heat from the second coolant is transferred through the cooling jacket to the first coolant causing the second coolant to phase change into a liquid.

2. The system of claim 1, wherein the inverter comprises an insulated gate bipolar transistor and a direct bonded copper substrate, the insulated gate bipolar transistor coupled to the direct bonded copper substrate and disposed proximate the spray head.

3. The system of claim 1, wherein the first coolant comprises water ethylene glycol.

4. The system of claim 1, further comprising:
    a sump pump assembly having:
        a reservoir disposed proximate the condenser to collect the liquid phase second coolant therefrom;
        a pump in fluid communication with the reservoir; and
        a return line disposed between and in fluid communication with the pump and the spray head.

5. The system of claim 1, wherein the second coolant comprises a dielectric liquid coolant.

6. The system of claim 5, wherein the dielectric liquid coolant comprises propylene glycol methyl ether and hexamethyidisiloxane.

7. The system of claim 1, wherein the cooling jacket comprises pin fins extending from the inner wall towards the outer wall or from the outer wall towards the inner wall.

8. The system of claim 1, wherein the condenser is defined at least in part by the cooling jacket outer wall and the integrated electric motor-inverter housing.

9. A cooling system, comprising:
    a heat exchanger;
    a first coolant in fluid communication with the heat exchanger;
    an integrated electric motor-inverter in thermal communication with the first coolant, the integrated electric motor-inverter including a housing, a motor, and an inverter, the motor and the inverter disposed adjacent each other within the housing, and the motor including a stator;
    a cooling jacket disposed concentric to the stator and including an inner wall and an outer wall and the first coolant disposed therebetween, the inner wall in direct contact with the stator;
    a condenser disposed concentric to the cooling jacket;
    a spray head disposed adjacent the inverter within the housing; and
    a second coolant in flow communication with the spray head,
    wherein during system operation, (i) the second coolant is directed onto the inverter by the spray head, (ii) at least a portion of the second coolant enters the condenser in a gas phase, and (iii) the second coolant contacts the cooling jacket outer wall and heat from the second coolant is transferred through the cooling jacket to the first coolant causing the second coolant to phase change into a liquid.

10. The system of claim 9, wherein the inverter comprises an insulated gate bipolar transistor and a direct bonded copper substrate, the insulated gate bipolar transistor coupled to the direct bonded copper substrate and disposed proximate the spray head.

11. The system of claim 9, wherein the first coolant comprises water ethylene glycol.

12. The system of claim 9, further comprising:
    a sump pump assembly having:
        a reservoir disposed proximate the condenser to collect the liquid phase second coolant therefrom;
        a pump in fluid communication with the reservoir; and
        a return line disposed between and in fluid communication with the pump and the spray head.

13. The system of claim 9, wherein the second coolant comprises a dielectric liquid coolant.

14. The system of claim 13, wherein the dielectric liquid coolant comprises propylene glycol methyl ether and hexamethyidisiloxane.

15. The system of claim 9, wherein the cooling jacket comprises pin fins extending from the inner wall towards the outer wall or from the outer wall towards the inner wall.

16. The system of claim 9, wherein the condenser is defined at least in part by the cooling jacket outer wall and the integrated electric motor-inverter housing.

17. A method for cooling an integrated electric motor-inverter, the integrated electric motor-inverter including a housing, a motor, and an inverter, and the motor including a stator, the method comprising the steps of:
flowing a first coolant through a cooling jacket defined, in part, by an inner wall and an outer wall, the inner and outer walls disposed concentric to the stator, and the inner wall in direct contact with the stator such that heat is absorbed from the stator through the cooling jacket inner wall into the first coolant; and
directing a second coolant onto the inverter, wherein the second coolant migrates into a condenser in a gas phase, the condenser disposed concentric to the cooling jacket and defined, in part by an outer surface of the cooling jacket outer wall and the gas phase second coolant contacts the cooling jacket outer wall outer surface to transfer heat from the second coolant to thereto and phase change the gas phase second coolant into a liquid second coolant.

18. The method of claim 17, wherein the step of flowing a first coolant comprises flowing the first coolant between the cooling jacket and a heat exchanger.

19. The method of claim 17, wherein the step of flowing a first coolant comprises flowing the first coolant such that heat is transferred to the first coolant from at least one pin fin extending from the inner wall towards the outer wall or from the outer wall towards the inner wall.

20. The method of claim 17, further comprising:
pumping the liquid second coolant to a spray head; and
wherein the step of directing comprises spraying the liquid second coolant at the inverter, at least a portion of the liquid second coolant sprayed at the inverter in a gaseous phase.

* * * * *